United States Patent [19]
Casset

[11] 3,947,141
[45] Mar. 30, 1976

[54] FISHING ROD HAVING ELASTIC FERRULE CONNECTIONS
[75] Inventor: Jacques G. Casset, Granada, Spain
[73] Assignee: Strateurop S.A., Granada, Spain
[22] Filed: July 18, 1974
[21] Appl. No.: 489,531

[30] Foreign Application Priority Data
July 20, 1973 France .............................. 73.26972

[52] U.S. Cl. .................. 403/109; 403/166; 43/18 R
[51] Int. Cl.² ......................................... F16B 7/10
[58] Field of Search ...... 403/166, 229, 109; 52/726; 43/18 R, 18 GF; 135/15 PQ

[56] References Cited
UNITED STATES PATENTS
| | | | |
|---|---|---|---|
| 1,348,145 | 8/1920 | Arden | 52/726 X |
| 3,036,398 | 5/1962 | Gagner | 43/18 R |
| 3,205,611 | 9/1965 | Onanian | 285/425 X |
| 3,635,233 | 1/1972 | Robertson | 135/15 PQ |

FOREIGN PATENTS OR APPLICATIONS
| | | | |
|---|---|---|---|
| 82,679 | 2/1964 | France | 403/145 |
| 856,466 | 11/1970 | Canada | 403/229 |
| 450,383 | 1948 | Canada | 43/18 R |

Primary Examiner—Andrew V. Kundrat
Attorney, Agent, or Firm—Fitzpatrick, Cella, Harper & Scinto

[57] ABSTRACT

A fishing rod comprising a plurality of segments adapted to be coupled together by means of coupling ferrules including an elastic member interconnecting each segment whereby the ferrule connections are retained in locking condition during use of the fishing rod.

16 Claims, 3 Drawing Figures

FISHING ROD HAVING ELASTIC FERRULE CONNECTIONS

BACKGROUND

The present invention relates generally to an improved fishing rod construction and more particularly to a segmented fishing rod normally coupled by means of coupling ferrules wherein the segments are permanently interconnected by an elastic member.

Segmented fishing rods are well-known in the art, the segments being assembled by means of ferrules. For example, an end of one segment of the rod is provided with an extension of slightly smaller outside diameter. This extension is adapted to be fitted within a female part provided at one end of another segment of the rod. For fishing rods having more than two segments, each segment is coupled together in like fashion.

According to present practice such ferrule connections may take various forms. In some embodiments, the male section is tubular. On the other hand, it is also known to provide on one segment of the rod an integral extension which is slightly frusto-conical. The frusto-conical section is adapted to be fitted in a corresponding slightly frusto-conical part provided in an extremity of another segment of the rod.

In any of the known ferrule type connections for segmented rods, it is essential that the connecting parts be of very close tolerances in order for ease of assembly and disassembly and yet provide a secure friction connection during use of the fishing rod. However, with the known types of ferrule connections, after repeated assembly and disassembly, the elements of the ferrules become worn and fail to provide the necessary secure fit. Thus, the rod segments no longer are able to be assembled in a rigid manner for fishing and the rod becomes useless.

Accordingly, a principal object of the present invention is to provide in a segmented fishing rod a ferrule assembly which is unaffected by repeated use and wear and which automatically takes-up any play between the respective segments.

SUMMARY

According to the present invention there is provided in a segmented fishing rod, a ferrule construction having a slightly conical male part and a slightly frusto-conical female part; interconnecting said segments in an elastic member passing through said male part. In such manner, the ferrule connection is maintained in constant traction when the segments are assembled.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein.

DESCRIPTION

Figure 1:
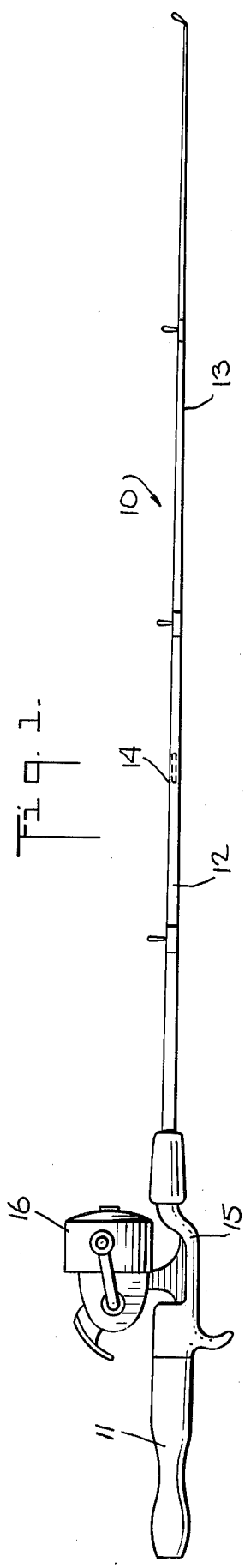
FIG. 1 represents a plan view of a segmented fishing rod suitable for the present invention.

Referring to FIG. 1, there is illustrated a segmented fishing rod generally indicated by the numeral 10. The rod 10 is comprised of two segments 12 and 13 coupled by a ferrule 14. The rod further comprises a handle 11 and means 15 for attaching a reel 16 thereto. Although the rod illustrated will be recognized as a spin casting arrangement, it should be understood that the novel ferrule connection of the invention is useful for all casting rods which are segmented. Moreover, as will be described more fully hereinafter, the ferrule construction of the invention is useful for all segmented rods independent of the number of segments.

Figure 2:
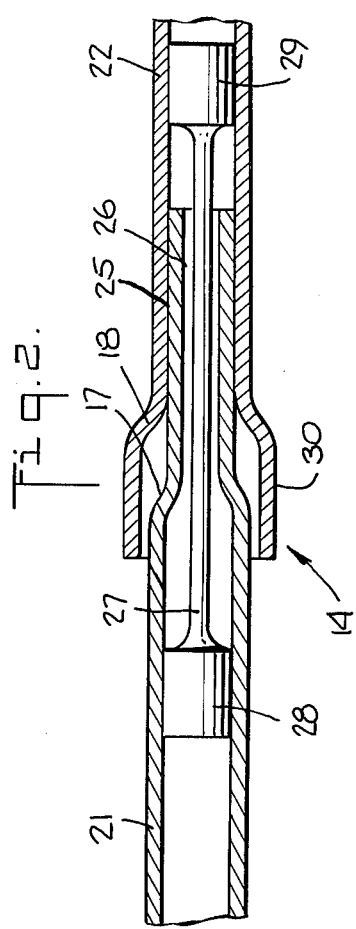
FIG. 2 represents a longitudinal cross-section of a ferrule connection according to the invention.

Referring now to FIG. 2, there is illustrated a ferrule construction according to the invention. Depending upon the nature of the fishing rod, the ferrule connection may be either formed directly of the rod material or may alternatively be constructed of a different material which is joined permanently to the rod segments during manufacture. Thus, for example, if the fishing rod is metal, the ends of each segment are simply pre-formed into the necessary configuration. The same applies to fiber glass rods, but it is often more preferable to fit metallic ferrules to a fiber glass rod.

As illustrated, the ferrule 14 comprises mating elements adapted to be fit flush at each end of segments 12 and 14 by means of at least partially tubular elements 21 and 22. Element 21 includes the male coupling part of the ferrule and comprises a partially frusto-conical shoulder 17 and a reduced diameter section 25. Female part 22 optionally includes a portion 30 of slightly increased diameter and a shoulder 18. The portion 30 is dimensioned to slightly overlap the end of extension 21. One skilled in the art will recognize that the ferrule extensions 21 and 22 are constructed to provide a close tolerance fit therebetween. Since in most fishing rods the segments 12 and 13 are a continuous taper, extension 25 also is slightly tapered to provide the necessary friction fit within section 22.

Extension 25 of element 21 includes an axial bore 26 through which an element 27 of elastic link-up is arranged to provide constant traction between elements 21 and 22. The extremity 28 of elastic element 27 is permanently secured within element 21, for example by glueing, and its other extremity 29 is secured within element 22 in the same manner.

In accordance with the present invention, the elastic element 27 may be made of any material which will provide the necessary constant traction between elements 21 and 22. For example, element 27 may be a rubber band or alternatively a helical spring. Any elastomeric material is acceptable. The elasticity of element 27 is such that it maintains extension 25 constantly fitted and wedged in the corresponding part of element 22, while nevertheless permitting disassembly of the rod segments at will, the relative axial displacement of elements 21 and 22 being sufficient to disjoin them and to arrange the rod segments in parallel relationship for storage.

The elastic link-up element 27 functions to take up any play between elements 21 and 22 and thus rod segments 12 and 13 when a fisherman assembles the rod prior to fishing, as well as when casting. In the latter case, it will be appreciated that casting causes shaking of the rod segments which heretofore tended to loosen the ferrule connection. However, with the provision of an elastomeric member interconnecting the rod segments, any play caused by loosening of the ferrule is immediately taken up, thus providing for a constant tight fit.

Figure 3:
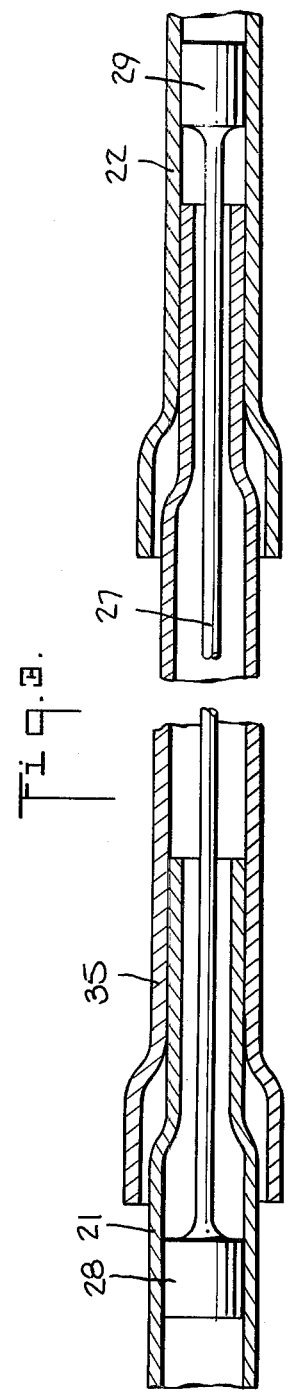
FIG. 3 represents a fragmented longitudinal cross-section of a second embodiment of the ferrule connection.

In accordance with the embodiment illustrated in FIG. 3 wherein like numerals indicate similar parts, there is provided an intermediate rod segment 35 between the elements 21 and 22. In this instance, the intermediate section 35 is tubular in order to permit passage of the elastic element 27 therethrough, the extremities 28 and 29 of the elastic element 27 being permanently secured, as in the preceding embodiment, within elements 21 and 22 respectively. Of course, the intermediate segment 35 is provided with end configurations similar to elements 21 and 22 in order to provide the necessary connection therebetween. In such manner, a fishing rod having three or more segments may be provided with the ferrule connection of the invention. However, it is to be understood that a fishing rod comprised of more than two segments may also be constructed of individual ferrule connections such as is illustrated in FIG. 2.

A fishing rod provided with the ferrule connection of the invention may be used in all cases in which one desires to obtain a rapid assembly or disassembly of its segments while maintaining a secure coupling between the segments without play for a long period of operation.

What is claimed is:

1. A fishing rod comprising at least two rod segments, an end of one of said segments having a tapered, hollow extension dimensioned to snugly fit within a hollow mating, tapered end of a second segment, said extension having a first surface wedging against the inner tapered surface of said mating end, and a second surface on said mating end providing a radial clearance between the end of said first segment and said mating end; and elastic connector means extending between said segments and having one end fastened within said one segment and the other end fastened within said second segment, said means taking up any play between said extension and said mating end and permitting said segments to be folded one upon the other.

2. A fishing rod according to claim 1 wherein said extension is frusto-conical.

3. A fishing rod according to claim 1 wherein said segments have an annular, tapered cross-section.

4. A fishing rod according to claim 1 wherein said elastic means comprises a rubber band.

5. A fishing rod according to claim 1 wherein said elastic means is a helical spring.

6. A fishing rod according to claim 1 further including a frusto-conical shoulder between said tapered extension and said one segment.

7. A fishing rod according to claim 6 wherein said second segment further includes an end portion having a diameter greater than the diameter of said one segment to partially overlap said one segment and a frusto-conical shoulder between said end portion and said mating end.

8. A fishing rod comprising a first rod segment, a second rod segment and at least one intermediate rod segment, one end of said first segment having a tapered, hollow extension dimensioned to snugly fit within a hollow mating tapered end of said intermediate segment, said extension having a first surface wedging against the inner tapered surface of said mating end, and a second surface on said mating end providing a radial clearance between the end of said first segment and said mating end; and elastic connector means extending through said intermediate segment and the other end fastened within said second segment, said means taking up any play between said extension and said mating end and permitting said segments to be folded one upon the other.

9. A fishing rod according to claim 8 wherein said elastic means is a rubber band.

10. A fishing rod according to claim 8 wherein said elastic means is a helical spring.

11. A fishing rod according to claim 8 wherein said intermediate segment includes a tapered, hollow extension dimensioned to snugly fit within a mating end of said second segment, said extension having a first surface for wedging against the inner surface of said mating end of said second segment and a second surface to provide a clearance between the end of said intermediate segment and said mating end of said second segment.

12. In a fishing rod having at least two interconnecting segments, a ferrule connector comprising a tubular member adapted to be attached to one end of one of said rod segments and having a hollow, tapered extension, a mating tubular end piece adapted to be attached to an end of another one of said rod segments, said mating tubular end piece having a portion of progressively reduced inner diameter, said extension having a first surface wedging against said progressively reduced inner diameter, and a second surface on said end piece providing a radial clearance between said tubular member and said mating tubular end piece; and elastic connector means interconnecting said tubular members, the ends of said means being secured to the distal ends of said tubular members, said means taking up any play between said extension and said progressively reduced inner diameter and permitting said segments to be folded one upon the other.

13. A ferrule according to claim 12 wherein said tapered extension is frusto-conical and further including an intermediate frusto-conical shoulder between said tubular member and said extension.

14. A ferrule according to claim 12 wherein said mating tubular end piece further includes a portion having a diameter greater than said tubular member and adapted to partially overlap said tubular member; and an intermediate frusto-conical shoulder between said greater diameter portion and said progressively reduced inner diameter portion.

15. A ferrule according to claim 12 wherein said elastic means is a rubber band.

16. A ferrule according to claim 12 wherein said elastic means is a helical spring.

* * * * *